United States Patent [19]
Braun

[11] Patent Number: 5,447,478
[45] Date of Patent: Sep. 5, 1995

[54] AUXILIARY TRANSMISSION SECTION

[75] Inventor: Eugene R. Braun, Royal Oak, Mich.

[73] Assignee: Eaton Corporation, Cleveland, Ohio

[21] Appl. No.: 38,653

[22] Filed: Mar. 29, 1993

[51] Int. Cl.⁶ .............................................. F16H 3/64
[52] U.S. Cl. ...................................................... 475/282
[58] Field of Search ..................... 475/282, 314, 320

[56] References Cited

U.S. PATENT DOCUMENTS

| | | |
|---|---|---|
| 2,637,221 | 5/1953 | Backus et al. . |
| 2,637,222 | 5/1953 | Backus . |
| 3,105,395 | 10/1963 | Perkins . |
| 3,283,613 | 11/1966 | Perkins . |
| 3,648,546 | 3/1972 | McNamara et al. . |
| 3,691,869 | 9/1972 | Klaue . |
| 3,799,002 | 3/1974 | Richards . |
| 4,043,225 | 8/1977 | Momose ................. 475/282 |
| 4,142,425 | 3/1979 | Ahlen et al. ............ 475/282 |
| 4,290,515 | 9/1981 | Bogema et al. . |
| 4,440,037 | 4/1984 | Foxton et al. . |
| 4,527,447 | 7/1985 | Richards . |
| 4,754,665 | 7/1988 | Vandervoort . |
| 4,986,142 | 1/1991 | Borodin et al. . |
| 5,203,749 | 4/1993 | Ito . |

FOREIGN PATENT DOCUMENTS

| | | |
|---|---|---|
| 0024454 | 3/1981 | European Pat. Off. . |
| 0433448 | 7/1989 | European Pat. Off. . |
| 2623869 | 12/1988 | France . |
| 2842843 | 4/1980 | Germany . |
| 4201653 | 7/1992 | Germany . |
| 1382680 | 3/1988 | U.S.S.R. ..................... 475/282 |

OTHER PUBLICATIONS

Small Scale Print No. 016-AD; Fuller Transmissions; Models RT-14613, RTO-14613, RTOO-14613, Mar. 1981 by Eaton Corporation.

*Primary Examiner*—Timothy S. Thorpe
*Attorney, Agent, or Firm*—Brooks & Kushman

[57] ABSTRACT

A two layer auxiliary transmission section for a compound change gear transmission including a main transmission section connected in series with the auxiliary transmission section, the auxiliary transmission section including a planetary gear set including a sun gear and ring gear assembly, defining in part selectable torque flow paths between an auxiliary section input shaft and an output shaft.

19 Claims, 2 Drawing Sheets

AUXILIARY TRANSMISSION SECTION

TECHNICAL FIELD

The present invention relates to an auxiliary transmission section for a compound transmission and, more particularly, to an improved auxiliary transmission section including a planetary gear set for defining selectable torque flow paths between the auxiliary section input and output shafts.

BACKGROUND ART

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a three (3) speed main section connected in series with a four (4) speed auxiliary section will provide twelve ($3 \times 4 = 12$) available ratios.

Auxiliary transmission sections are of three general types: range type, splitter type or combined range/splitter type.

In compound transmissions having a range type auxiliary section, the ratio step or steps may be greater, equal or less than the total ratio coverage of the main transmission section and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference and to publication Small Scale Print No. 016-AD; Fuller Transmissions; Models RT-14613, RTO-14613, RTOO-14613, published March 1981 by Eaton Corporation, assignee of this invention, the disclosure of which is hereby incorporated by reference. Another example is the "Ecosplit" model of transmission sold by Zahnradfabrik Friedrichshafen Aktiengeseushaft of Friedrichshafen, Federal Republic of Germany which utilizes a separate splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

A conventional auxiliary transmission section such as that disclosed in U.S. Pat. No. 4,754,665 includes an auxiliary section input shaft and an output shaft cooperably forming a mainshaft assembly, and an auxiliary countershaft assembly. The auxiliary transmission section includes three gear layers, combined range and splitter gearing and four distinct selectable auxiliary section ratios.

DISCLOSURE OF INVENTION

An object of the present invention is to provide a new and improved auxiliary transmission section for a compound change gear transmission that is shorter, more compact and has higher torque capacity than conventional auxiliary transmission sections.

Another object of the present invention is to provide a new and improved two layer auxiliary transmission section for a compound change gear transmission which combines gearing to give four speeds.

Another object of the present invention is to provide an improved auxiliary transmission section including a planetary gear set eliminating excessive gearing to establish selectable torque flow paths between an auxiliary section input shaft and output shaft.

Another object of the present invention is to provide an auxiliary transmission section of the splitter and range type wherein the torque flow path through the splitter is defined in part by a planetary gear set.

A further object of the present invention is to provide an auxiliary transmission section of the splitter and range type wherein the torque flow path through the range is defined in part by a planetary gear set.

Another object of the present invention is to provide an auxiliary transmission section of the splitter and range type wherein the torque flow path through the splitter is defined in part by a planetary gear set and wherein the torque flow path through the range is also defined in part by a planetary gear set.

In carrying out the above object, the improved auxiliary transmission section is a splitter and range type auxiliary transmission section for a compound change gear transmission comprising an auxiliary transmission section. The auxiliary transmission section comprises a housing, an auxiliary section input shaft extending into the housing and driven by the main transmission section and an output shaft extending from the housing. The auxiliary transmission section is characterized by a planetary gear set including a sun gear and planet carrier assembly, defining in part selectable torque flow paths between the auxiliary section input shaft and auxiliary section output shaft.

The planetary gear set can be utilized as the range gear set, or the splitter gear set in the auxiliary transmission section. In addition, a second planetary gear set including a sun gear and planet carrier assembly can be coupled with the other planetary gear set, wherein one planetary gear set defines the splitter section of the auxiliary transmission section and the second planetary gear set defines the range section of the auxiliary transmission section for defining multiple selectable torque flow paths between the auxiliary section input shaft and output shaft.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
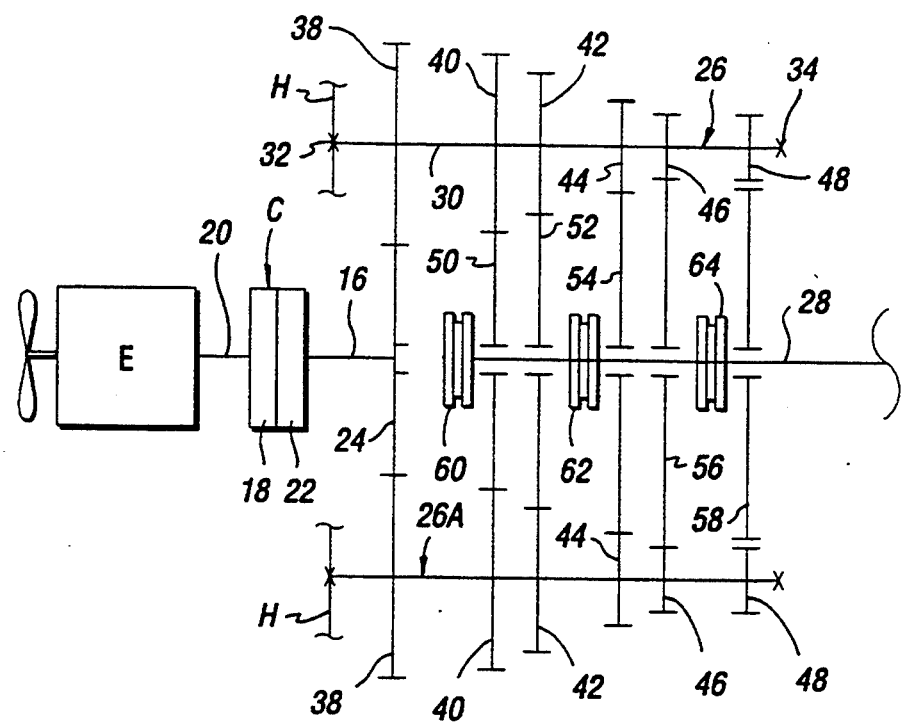
FIG. 1 is a schematic illustration of a prior art main transmission section of a compound transmission.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectively to the left and right sides of the prior art main transmission section illustrated in FIG. 1.

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the speed gear ratio is changed from a lower value to a higher value. The term "downshift" as used herein shall means the shifting from a higher speed gear ratio to a lower speed gear ratio. The terms "low speed gear" or "low gear" as used herein shall designate a gear ratio utilized for relatively lower forward speed operation in a transmission, i.e. a set of gears having a higher ratio of reduction of output shaft speed relative to the speed of the input shaft. "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

The auxiliary transmission section 10 hereinafter disclosed is used in combination with a main transmission section 12 to provide a compound transmission.

One example of a main transmission section 12 is hereinafter disclosed for purposes of describing the auxiliary transmission 10. Other types of main transmission sections can be connected up to the auxiliary transmission section 10.

With reference to FIG. 1, a prior art main transmission section is schematically illustrated. Typically, the auxiliary transmission section 10 and main transmission section 12 are housed within a single housing. Main transmission section 12 includes an input shaft 16 driven by a prime mover such as diesel engine E through a selectively disengaged, normally engaged friction master clutch C having an input or driving section 18 drivingly connected to the engine crankshaft 20 and a driven portion 22 rotatably fixed to the transmission input shaft 16.

In the main transmission section 12, the input shaft 16 carries an input gear 24 for simultaneously driving a plurality of substantially identical main section countershaft assemblies 26 and 26a at substantially identical rotational speeds. In the transmission 10 illustrated, two substantially identical main section countershaft assemblies are provided on diametrically opposite sides of a mainshaft 28, which mainshaft is generally coaxially aligned with the input shaft 16. Each of the main section countershaft assemblies 26 and 26a comprises a main section countershaft 30 supported by bearings 32 and 34 in housing H, only a portion of which is schematically illustrated.

Each of the main section countershafts 30 is provided with an identical grouping of main section countershaft gears 38, 40, 42, 44, 46 and 48, fixed for rotation therewith. A plurality of main section drive or mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group.

Typically, clutch collars 60, 62 and 64 are axially positioned by means of shift forks (not illustrated) associated with a shift bar housing assembly (not illustrated) as well known in the prior art. Clutch collars 60, 62 and 64 are of the well known non-synchronized double acting jaw clutch type.

With continued reference to FIG. 1, main section mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio namely, that ratio provided by drivingly connected mainshaft drive gear 56 to mainshaft 28 is often of such a high gear reduction as to be considered a low or "creeper" gear which is utilized only for starting of a vehicle under severe conditions and is usually not utilized in the high transmission range and/or may not be split in the low transmission range.

Jaw clutches 60, 62 and 64 are three-position clutches in that they may be positioned in a centered, non-engaged position as illustrated or in a fully rightwardly engaged or fully leftwardly engaged position.

Figure 2:
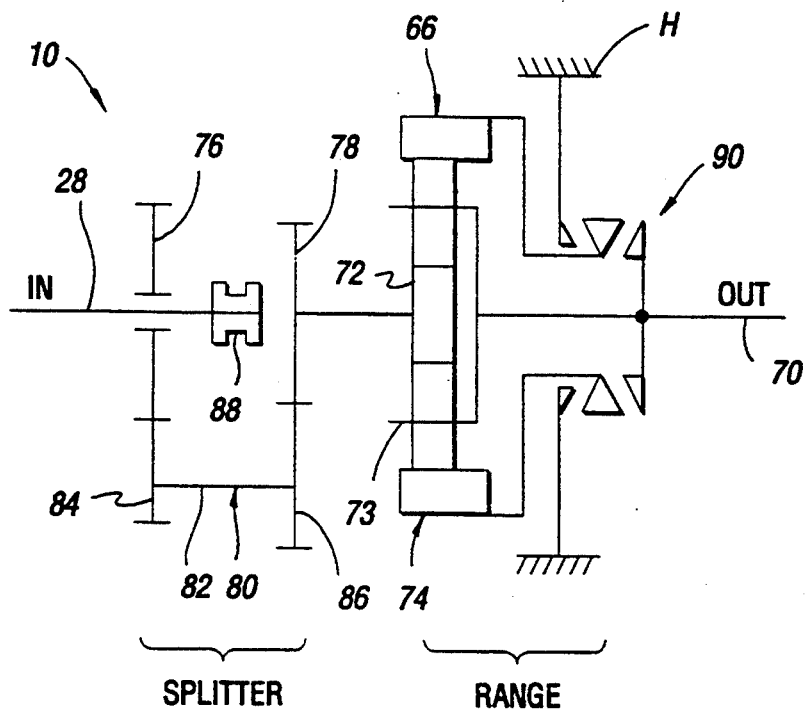
FIG. 2 is a schematic illustration of a first embodiment of an auxiliary transmission section of the combined splitter/range type constructed in accordance with the present invention for coupling with a main transmission section of a compound transmission illustrating a planetary gear set defining the range transmission section in the auxiliary transmission section.
Figure 3:
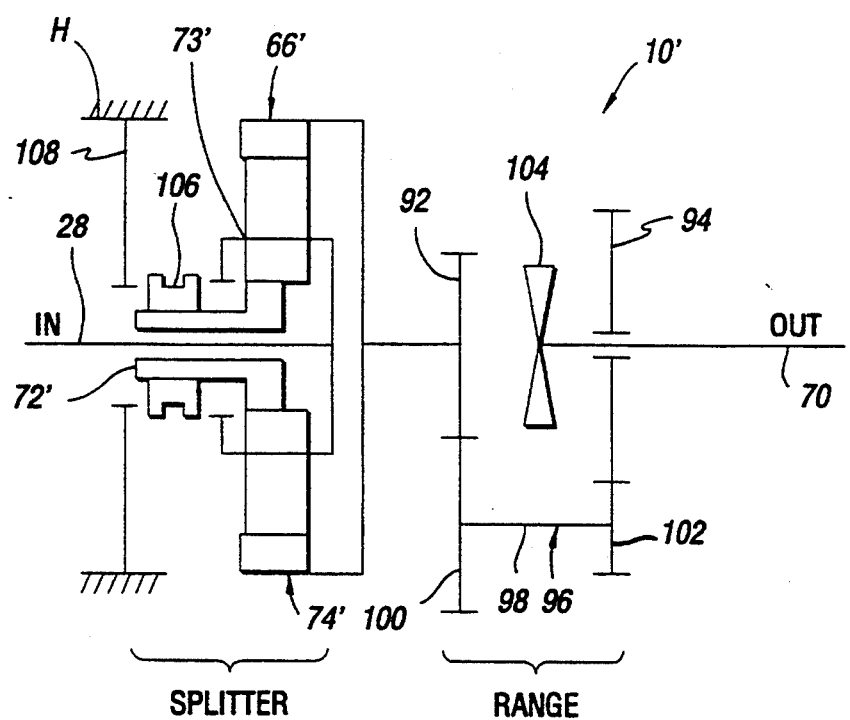
FIG. 3 is a schematic illustration of a second embodiment of the auxiliary transmission section illustrating the use of a planetary gear set to define the splitter section thereof.
Figure 4:
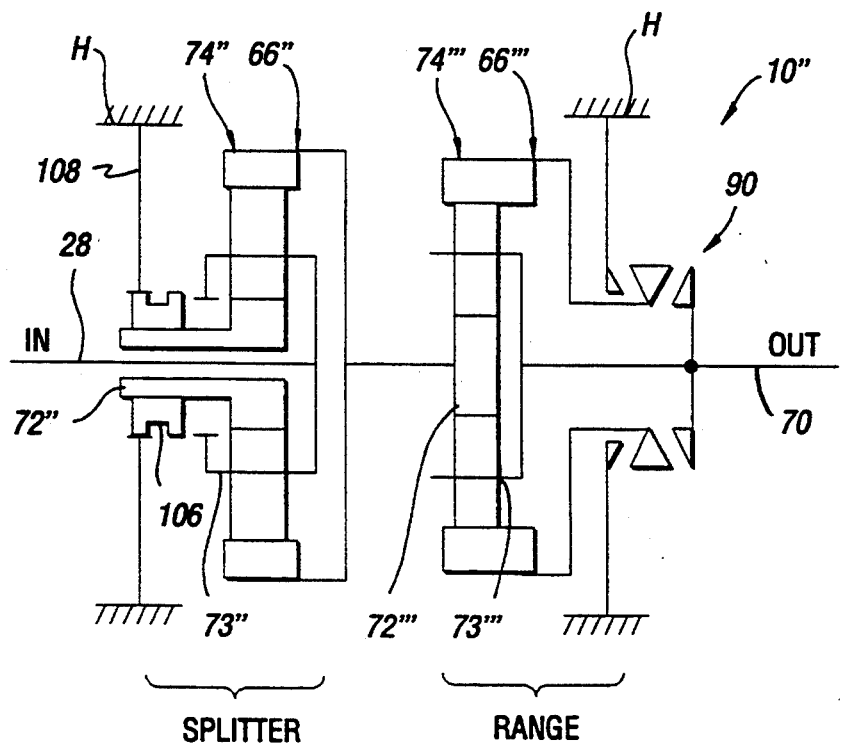
FIG. 4 is a schematic illustration of a third embodiment of the auxiliary transmission section illustrating a first planetary gear set, defining the splitter section, coupled to a second planetary gear set, that defines the range section of the auxiliary transmission.

Referring now to FIGS. 2, 3 and 4, auxiliary transmission section 10 is described with reference to main transmission section 12 although the auxiliary transmission section described can be utilized with other type main transmission sections. Three embodiments of auxiliary transmission section 10 are illustrated in FIGS. 2, 3 and 4, respectively.

Auxiliary transmission section 10 is of the splitter/range type and the unique characteristic about this transmission is that it utilizes a planetary gear set 66 to define in part selectable torque flow paths between the auxiliary section input shaft 28 and output shaft 70. Planetary gear set 66 includes a sun gear 72, a planet gear assembly 73 and a ring gear assembly 74.

FIG. 2 illustrates a first embodiment of the auxiliary transmission section 10 wherein the planetary gear set 66 defines the range section of the auxiliary transmission. The splitter section includes a splitter gear 76 and a connecting gear 78 generally coaxial with and rotatable relative to the auxiliary section input shaft 28 and output shaft 70. The connecting gear 78 is fixed for rotation with the sun gear 72 and the planetary gear set 66 is generally coaxial with and selectively engageable with the output shaft 70.

An auxiliary section countershaft assembly 80 includes an auxiliary countershaft 82 rotationally supported in the housing H. A first auxiliary countershaft gear 84 is rotationally fixed to the auxiliary countershaft 82 and constantly meshed with the splitter gear 76. A second auxiliary countershaft gear 86 is rotationally fixed to the auxiliary countershaft 82 and constantly meshed with connecting gear 78.

A two-position splitter clutch assembly 88 is fixed for rotation with the auxiliary section input shaft 28. Splitter clutch assembly 88 has a first position for coupling the splitter gear 76 to the auxiliary section input shaft 28 and a second position for coupling the connecting gear 78 to the auxiliary section input shaft. A control (not shown) of conventional design is operable for independently positioning the splitter clutch assembly 88 and selecting one of two torque flow paths through the splitter section of the auxiliary transmission section 10.

A friction coupling assembly or a synchronizer or cone clutch assembly 90 of conventional design is operable for selective operation to clutch or brake the ring gear assembly 74 of the planetary gear set 66 to provide a selectable torque flow path through the planetary gear set to the output shaft 70.

A second embodiment of the auxiliary transmission section 10' is illustrated in FIG. 3. As illustrated in FIG. 3, the planetary gear set 66' defines the splitter section of the auxiliary transmission 10. The range section includes a range input gear 92 rotationally fixed to the ring gear assembly 74' which is coaxial with the auxiliary section input shaft 28. An output shaft range gear 94 is coaxial with and rotatable relative to the output shaft 70. An auxiliary section countershaft assembly 96 includes an auxiliary countershaft 98 rotationally supported in housing H. A first auxiliary countershaft gear 100 is rotationally fixed to the auxiliary countershaft 98 and constantly meshed with the range input gear 92. A second auxiliary countershaft gear 102 is rotationally fixed to the auxiliary countershaft 98 and constantly meshed with the output shaft range gear 94.

A two-way synchronizer 104 is rotationally fitted to the output shaft 70 for synchronizing engagement with the output shaft splitter gear 94 or range input gear 92. Therefore, operation of two-way synchronizer 104 provides two torque flow paths through the range section of the second embodiment.

With continued reference to FIG. 3, the splitter section includes a two-position splitter clutch assembly 106 fixed for rotation with the sun gear 72' and having a first position for coupling the sun gear with a positive engagement brake 108 and a second position for coupling the sun gear with the planet gear assembly 73' to define selectable torque flow paths through the splitter section.

Referring now to FIG. 4, a third embodiment of the auxiliary transmission section 10 is illustrated wherein both the splitter and range section are defined by independent first and section planetary gear sets 66" and 66'". Like reference characters to hereinabove reference characters refer to similar structure having similar function. The splitter section planetary gear set 66" is the same in structure and function as the splitter planetary gear set 66' described with reference to FIG. 3. Range planetary gear set 66'" is the same in structure and function as the planetary gear set 66 described with reference to FIG. 2.

With continuing reference to FIG. 4, the sun gear 72'" of the second planetary gear set 66'" is coupled with the ring gear assembly 74" of the first planetary gear set 66". Independent operation of the splitter clutch 106 in the splitter section and friction cone clutch assembly 90 in the range section provides a plurality of desired overall ratios for the auxiliary transmission section 10. Other types of conventional clutches can be utilized for clutching and braking the first and second planetary gear sets 66", 66'".

While the best mode for carrying out the invention has been described in detail, those familiar with the art to which this invention relates will recognize various alternative designs and embodiments for practicing the invention as defined by the following claims.

What is claimed is:

1. A combined range and splitter type auxiliary transmission section for a compound change gear transmission having a main transmission section connected in series with the auxiliary transmission section, said auxiliary transmission section including a housing, an auxiliary section input shaft extending into said housing and driven by said main transmission section and an output shaft extending from said housing, said auxiliary transmission section comprising:

at least one planetary gear set operably connected to the auxiliary section input shaft, each of the at least one planetary gear set including a sun gear and a ring gear assembly, defining in part four selectable forward torque flow paths between said auxiliary section input shaft and said output shaft.

2. The auxiliary transmission section of claim 1 wherein the main transmission section comprises:

a main section input shaft;

an input shaft input gear rotationally fixed to said main section input shaft;

a mainshaft coaxially aligned with said main section input shaft and defining in part said auxiliary section input shaft;

two main section countershaft assemblies on diametrically opposite sides of said mainshaft;

bearings supporting said countershaft assemblies and mounted in said housing;

a plurality of main section countershaft gears fixed for rotation therewith;

a plurality of selectively clutchable mainshaft gears surrounding said mainshaft, said mainshaft gears being in engagement with said main section countershaft gears; and a plurality of sliding clutch collars for selectively engaging one of said plurality of selectively clutchable mainshaft gears to said mainshaft.

3. The auxiliary transmission section of claim 1 characterized by a splitter section further defining two torque flow paths; said splitter section including a splitter gear and a connecting gear generally coaxial with and rotatable relative to said auxiliary section input shaft and said output shaft; said connecting gear being fixed for rotation with said sun gear; said planetary gear set being generally coaxial with and selectively engageable with said output shaft;

an auxiliary section countershaft assembly comprising an auxiliary countershaft rotationally supported in said housing H, a first auxiliary countershaft gear rotationally fixed to said auxiliary countershaft and constantly meshed with said splitter gear, a second auxiliary countershaft gear rotationally fixed to said auxiliary countershaft and constantly meshed with said connecting gear;

a two-position splitter clutch assembly fixed for rotation with said auxiliary section input shaft and having a first position for coupling said splitter gear to said auxiliary section input shaft and a second position for coupling said connecting gear to said auxiliary section input shaft;

a friction coupling assembly mounted to said output shaft and housing for clutching and braking said ring gear assembly of said planetary gear set; and control means for independently positioning said splitter clutch assembly and friction cone coupling assembly for selecting discrete torque flow paths through said planetary gear set to establish a desired overall ratio for said auxiliary transmission section.

4. The auxiliary transmission section of claim 1 characterized by a range section further defining two torque flow paths; said range section including a range input gear rotationally fixed to said ring gear assembly of said planetary gear set and coaxial with said auxiliary section input shaft;

an output shaft range gear coaxial with and rotatable relative to said output shaft;

an auxiliary section countershaft assembly comprising an auxiliary countershaft rotationally supported in said housing H, a first auxiliary countershaft gear rotationally fixed to said auxiliary countershaft and constantly meshed with said range input gear, a second auxiliary countershaft gear rotationally fixed to said auxiliary countershaft and constantly meshed with said output shaft range gear; and a two-way synchronizer rotationally fitted to said output shaft for synchronizing engagement thereof with said output shaft splitter gear.

5. The auxiliary transmission section of claim 5 including a positive engagement brake supported by said housing;

a two-position splitter clutch assembly fixed for rotation on said sun gear and having a first position for coupling said positive engagement brake and a second position for coupling said ring gear assembly; and control means for independently positioning said splitter clutch assembly.

6. The auxiliary transmission section of claim 1 wherein the at least one planetary gear set comprises first and second planetary gear sets, said second planetary gear set including a sun gear and ring gear assembly, the sun gear of said second planetary gear set being coupled with the ring gear assembly of said first planetary gear set.

7. The auxiliary transmission section of claim 6 wherein at least one of said planetary gear sets is controlled by a friction coupling.

8. The auxiliary transmission section of claim 6 including a positive engagement brake supported by said housing; and a friction coupling assembly mounted to said output shaft and housing for clutching and braking said ring gear assembly of said second planetary gear set.

9. The auxiliary transmission section of claim 8 including a positive engagement brake supported by said housing; and a two-position splitter clutch assembly fixed for rotation on said sun gear of said first planetary gear set and having a first position for coupling said positive engagement brake and a second position for coupling said ring gear assembly.

10. The auxiliary transmission section of claim 6 wherein at least one of said planetary gear sets is controlled by a cone clutch assembly.

11. The auxiliary transmission section of claim 6 wherein at least one of said planetary gear sets is controlled by a jaw clutch assembly.

12. The auxiliary transmission section of claim 1 wherein each of the at least one planetary gear set includes a planetary carrier and wherein the auxiliary section input shaft is connected to one of the at least one planetary carrier so as to provide an underdrive arrangement.

13. The auxiliary transmission section of claim 1 wherein the auxiliary section input shaft is connected to the ring gear assembly so as to provide an overdrive arrangement.

14. The auxiliary transmission section of claim 8 wherein the main transmission section comprises:

a main section input shaft;

an input shaft input gear rotationally fixed to said main section input shaft;

a mainshaft coaxially aligned with said main section input shaft and defining in part said auxiliary section input shaft;

two main section countershaft assemblies on diametrically opposite sides of said mainshaft;

bearings supporting said countershaft assemblies and mounted in said housing;

a plurality of main section countershaft gears fixed for rotation therewith;

a plurality of selectively clutchable mainshaft gears surrounding said mainshaft, said mainshaft gears being in engagement with said main section countershaft gears; and a plurality of sliding clutch collars for selectively engaging one of said plurality of selectively clutchable mainshaft gears to said mainshaft.

15. A compound change gear transmission having a main section connected in series with an auxiliary section including an auxiliary section input shaft and an output shaft, the transmission being characterized by:

a combined range and splitter type auxiliary section which utilizes at least one planetary gear set to provide four forward gear ratios between the auxiliary section input shaft and the output shaft, wherein the at least one planetary gear set includes a planetary carrier assembly connected to the auxiliary section input shaft.

16. The transmission of claim 15 wherein the at least one planetary gear set includes first and second planetary gear sets each having a sun gear and a ring gear assembly, the sun gear of the second planetary gear set being connected to the ring gear assembly of the first planetary gear set.

17. The transmission of claim 16 wherein at least one of the first and second planetary gear sets is controlled by a friction coupling.

18. The transmission of claim 16 wherein at least one of the first and second planetary gear sets is controlled by a cone clutch assembly.

19. A combined range and splitter type auxiliary transmission section having an output shaft and an auxiliary section input shaft adapted for coupling in series to a main section of a compound change gear transmission, the combined range and splitter type auxiliary transmission section comprising:

a two layer construction which utilizes at least one planetary gear set having a sun gear, a carrier assembly connected to the auxiliary section input shaft, and a ring gear, the combined range and splitter type auxiliary section providing four forward gear ratios between the auxiliary section input shaft and the output shaft.

* * * * *

UNITED STATES PATENT AND TRADEMARK OFFICE
CERTIFICATE OF CORRECTION

PATENT NO. : 5,447,478
DATED : September 5, 1995
INVENTOR(S) : Eugene R. Braun

It is certified that error appears in the above-indentified patent and that said Letters Patent is hereby corrected as shown below:

Column 8, line 4,      After "claim" replace "5" with --4--.

Signed and Sealed this

Twenty-eighth Day of November 1995

Attest:

BRUCE LEHMAN

Attesting Officer      Commissioner of Patents and Trademarks